United States Patent [19]
Bellin

[11] Patent Number: 6,072,858
[45] Date of Patent: Jun. 6, 2000

[54] METHOD AND APPARATUS FOR DETECTING AND REPORTING A DEFECTIVE TELECOMMUNICATIONS LINE

[75] Inventor: Robert W. Bellin, Hartland, Wis.

[73] Assignee: Com/Energy Technologies, Inc.

[21] Appl. No.: 08/640,321

[22] Filed: Apr. 30, 1996

[51] Int. Cl.[7] .............. H04M 1/24; H04M 3/08; G08B 1/08
[52] U.S. Cl. .............. 379/33; 379/37; 379/44; 379/106.01; 379/40; 340/310.01; 340/538; 455/404
[58] Field of Search .............. 379/106.08, 106.02, 379/32, 33, 106.3, 106.01, 22–30, 34, 12, 39, 279, 37, 40, 42, 43, 44; 307/64, 66, 38, 147, 31; 370/241, 242, 247, 252; 340/314, 310.01, 840.28, 310.08, 538

[56] References Cited

U.S. PATENT DOCUMENTS

| | | |
|---|---|---|
| 4,114,141 | 9/1978 | Travis . |
| 4,135,181 | 1/1979 | Bogacki et al. . |
| 4,247,786 | 1/1981 | Hedges . |
| 4,302,750 | 11/1981 | Wadhwani et al. . |
| 4,589,075 | 5/1986 | Buennagel . |
| 4,656,319 | 4/1987 | Bially ........................................ 379/29 |
| 4,691,341 | 9/1987 | Knoble et al. . |
| 4,718,079 | 1/1988 | Rabito ........................................ 379/2 |
| 4,731,810 | 3/1988 | Watkins ..................................... 379/33 |
| 4,749,992 | 6/1988 | Fitzemeyer et al. . |
| 4,750,175 | 6/1988 | Brenneman et al. ..................... 379/22 |
| 4,839,917 | 6/1989 | Oliver ....................................... 379/45 |
| 4,937,851 | 6/1990 | Lynch et al. .............................. 379/6 |
| 4,949,272 | 8/1990 | Vanourek et al. . |
| 4,993,059 | 2/1991 | Smith et al. .............................. 379/39 |
| 5,086,385 | 2/1992 | Launey et al. . |
| 5,128,979 | 7/1992 | Reich et al. .............................. 379/40 |
| 5,179,376 | 1/1993 | Pomatto . |
| 5,185,779 | 2/1993 | Dop et al. ................................. 379/33 |
| 5,197,095 | 3/1993 | Bonnet et al. . |
| 5,222,119 | 6/1993 | Asano ....................................... 379/2 |
| 5,233,640 | 8/1993 | Kostusiak ................................. 379/39 |
| 5,233,646 | 8/1993 | Kuromi . |
| 5,379,341 | 1/1995 | Wan . |
| 5,386,461 | 1/1995 | Gedney . |
| 5,426,688 | 6/1995 | Anand ...................................... 379/10 |
| 5,459,772 | 10/1995 | Asano et al. ............................ 379/16 |
| 5,463,680 | 10/1995 | Bidese et al. . |
| 5,475,742 | 12/1995 | Gilbert . |
| 5,483,574 | 1/1996 | Yuyuma ................................... 379/32 |
| 5,577,098 | 11/1996 | Wani ........................................ 379/10 |
| 5,737,391 | 4/1998 | Dame et al. ............................. 379/37 |
| 5,745,849 | 4/1998 | Britton .................................... 379/33 |

OTHER PUBLICATIONS

Kaplan, Gadi, "Two–Way Communication for Load Management," *IEEE Spectrum*, Aug. 1977, pp. 47–50.

Anon., "Two–Way Data Communication Between Utility and Customer," *EPRI Journal*, May 1980, pp. 16–19.

Blair, W.E., "Communication Systems for Distribution Automation and Load Management Results of EPRI/DOE Research," *IEEE Transactions on Power Apparatus and Systems*, vol. PAS–101, No. 7, Jul. 1982, pp. 1888–1893.

Gorzelnik, Eugene F., "Electronic Meter Carves a Niche for Itself," *Electrical World*, Jan. 1983, pp. 119–126.

Moore, Taylor, "Automating the Distribution Network," *EPRI Journal*, Sep. 1984, pp. 22–28.

(List continued on next page.)

*Primary Examiner*—Curtis A. Kuntz
*Assistant Examiner*—Rexford Barnie
*Attorney, Agent, or Firm*—Louis J. Hoffman

[57] ABSTRACT

A system for detecting and reporting a defect in a telephone line includes a network of utility processors that communicate over a power line. Each utility processor monitors a telephone line connected to the processor. The utility processor includes a processing element, a line sensor, a telephone interface and a power line communication interface. Each utility processor reports a defect in the telephone line by sending message to a second utility processor via the power line. The second utility processor reports the defect to a central office via a telephone line.

16 Claims, 6 Drawing Sheets

OTHER PUBLICATIONS

Ciarcia, Steve, "Build the Home Run Control System Part 2: The Hardware," *Byte,* May 1985, pp. 109–125.

Ciarcia, Steve, "Build the Home Run Control System Part 3: The Software," *Byte,* Jun. 1985, pp. 121–142.

Cain, Charles J., "Utility Meter Reading—The Next Home for Fiber?," *FOC/LAN '88 Proceedings,* Papers Presented at the Twelfth International Fiber Optic Communications and Local Area Networks Exposition, Sep. 12–16, 1988, pp. 301–305.

Bushaus, Dawn, "Telcos Tiptoe Into Telemetry," *Telephony,* Apr. 16, 1990, Col. 218, No. 16, pp. 138–142.

Reason, John, "Packet Radio Moves Into Distribution Control," *Electrical World,* Jan. 1991, pp. 38–40.

Hofmann, J., "The Consumer Electronic Bus Infrared System," *IEEE Transactions on Consumer Electronics,* vol. 37, No. 2, May 1991, pp. 122–128.

Anon., "Will AMR Ever Get Off the Ground?" *Electrical World,* Oct. 1992, pp. 54, 56, 58.

Reason, John, "Communications Alternatives for Distribution Automation," *Electrical World,* Feb. 1993, pp. 29–37.

Reason, John, "Why Utilities Must Keep Pace with Radio Technology," *Electrical World,* Jul. 1993, pp. 33–42.

Anon., "Interest in AMR is Keen, but Commitment is Lean," *Electrical World,* Sep. 1993, pp. 59–60.

Honda, Yoshiyuki, et al., "An Optimized Gateway Controller for Ha System and Automatic Meter Reading System," *IEEE Transactions on Consumer Electronics,* vol. 37, No. 3, Aug. 1991, pp. 388–394.

Manikopoulos, Constantine N. and Jaesoo Yang, "Performance Analysis of a Gateway Connecting the Cebus to the ISDN," *IEEE Transactions on Consumer Electronics,* vol. 39, No. 4, Nov. 1993, pp. 870–877.

Proposal To PSI Energy, Dec. 14, 1994, pp. 33–35.

WEPO Communications To Purchase Equipment For Pilot Program, Mar. 6, 1995.

System Description Used In Oral Proposals For Pilot Program Implementations, Apr. 10 & 11, 1995.

METHOD AND APPARATUS FOR DETECTING AND REPORTING A DEFECTIVE TELECOMMUNICATIONS LINE

This patent document makes reference to an appendix, which includes a listing of the object code version of the software as well as schematics of the hardware for practicing a presently preferred embodiment of the invention. A portion of the disclosure of this patent document contains material which is subject to copyright protection. The copyright owner has no objection of the facsimile reproduction by anyone of the patent disclosure, as it appears in the Patent and Trademark Office files or records, but otherwise reserves all copyright rights whatsoever.

1. Field of the Invention

This invention relates to the field of telecommunications, and more particularly, to a system for detecting and reporting defective telecommunication lines.

2. Background of the Invention

Utility providers such as power and telephone companies provide their service to a large number of customers using equipment that may be distributed in remote locations. The combination of volume and distance may make it difficult for utility providers to obtain the operating status of such remotely located equipment.

With respect to telecommunication lines, the problem is magnified by the fact that customers only become aware of problems when they attempt to use the telephone. The problem with the telephone may also mean that the customer will have difficutly reporting the problem.

Moreover, telecommunications lines are finding use in applications that make it critical that the lines be operable even when the customer is not home. One example of such an application is a security system that uses the telephone line to call emergency services in case of a security breach. Although such security systems may have the ability to detect defects built into the system, the ability to notify the telephone company of the defect is often missing.

A system in which defects in a telecommunications line can be reported at the time the defect occurs would enable the telephone company to respond quickly.

SUMMARY OF THE INVENTION

In view of the above, it is an object of the present invention to provide a system that detects and reports defects in a telecommunications line. The system uses a network of utility processors that communicate with each other via a power line communications network. A first utility processor monitors a signal on the telecommunications line and generates an alarm when the signal reaches a state indicating a defect in the telecommunications line. The first utility processor reports the alarm to a second utility processor equipped to create a message that identifies both the defect and the utility processor reporting the telecommunications line defect. The second utility processor then reports the defect to a remote site, such as an alarm agency.

It is a further object of the present invention to provide a method for detecting and reporting defects in telecommunications lines by monitoring the telecommunications line for defects with a first utility processor, generating an alarm through the power line communications network to a second utility processor, and creating a message in the second utility processor for reporting to a remote site, such as a central alarm agency.

DETAILED DESCRIPTION OF THE PRESENTLY PREFERRED EMBODIMENTS

The description that follows refers to the drawings, identifying like elements by like numerals throughout. Although a presently preferred system is described, it can be appreciated by one of ordinary skill in the art that many variations are possible without departing from the scope of the invention.

Figure 1:
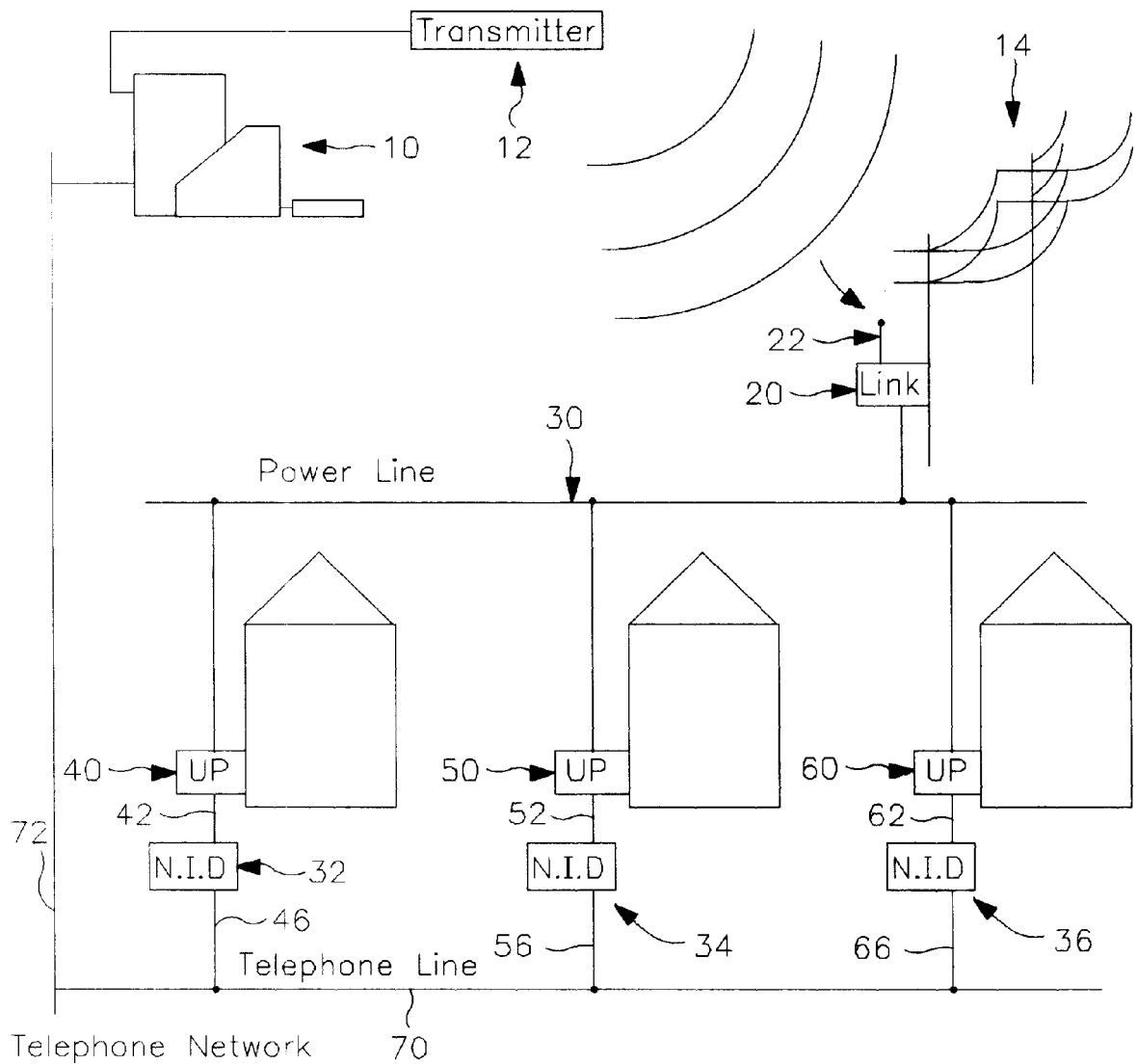
FIG. 1 is an example of a system that monitors utility equipment.

The present invention may also be carried out specifically as a system that detects defects in a telecommunication system, or as part of a larger system that monitors the status and performance of various pieces of utility equipment. FIG. 1 illustrates a system that can monitor the utility equipment for a power company and a telephone company. This system includes a central office terminal 10, a transmitter 12, a utility communications link 20 and a plurality of utility processors 40, 50, 60.

The central office terminal 10 transmits commands or requests for information to utility communications links such as the one shown at 20. The central office terminal 10 may be a basic computer system such as a PC, a mainframe, or a network of computers programmed to receive reports on the status of utility equipment.

The transmitter 10 may transmit signals by radio using systems that are well known such as a pager communication systems, a radio telecommunication system (such as a cellular system) or by a radio system designed for proprietary use. The signals transmitted by the transmitter 10 are received by the antenna 22 on the utility communications link 20.

The utility communications link 20 is connected to the power line 30 that services the buildings in the area in which the utility communications link 20 is installed. The connection is preferably on the secondary side of the last transformer servicing the area. In the system in FIG. 1, the central office terminal 10 transmits commands or requests for information by radio to the utility communications link 20, which then transmits a message consistent with the command or request for information to the utility processors 40, 50, 60 by communicating over the power line 30. The commands or requests for information may be directed to specific utility processors on specific buildings, and may involve commands to control equipment such as HVAC equipment, or to request information such as a power meter reading.

The utility processors 40, 50, 60 of a preferred embodiment are intended to interface with equipment on individual customer premises. Utility processors 40, 50, 60 may communicate with utility meters such as gas, power and water meters; or with HVAC equipment. Alternatively, utility processors 40, 50, 60 may be used solely for monitoring the status of the customer telephone lines 42, 52, 62 leading to the customer premises, or the telephone company's telephone lines 46, 56, 66 leading to the Network Interface Device (NID) 32, 34, 36 at a customer site. In the system of FIG. 1, the utility processors communicate back to the central office terminal 10 over the telephone line 70.

In the system of FIG. 1, the power line 30 is used as a communication network. Several implementations are possible. The utility communications link 20 may be used to communicate commands and requests for information in one direction from the central office terminal 10 to the utility processors 40, 50, 60. The utility communications link 20 may also be implemented without a radio antenna 22 or the ability to receive messages from the central office terminal 10, functioning instead as a network manager on the power line network 30.

Figure 2:
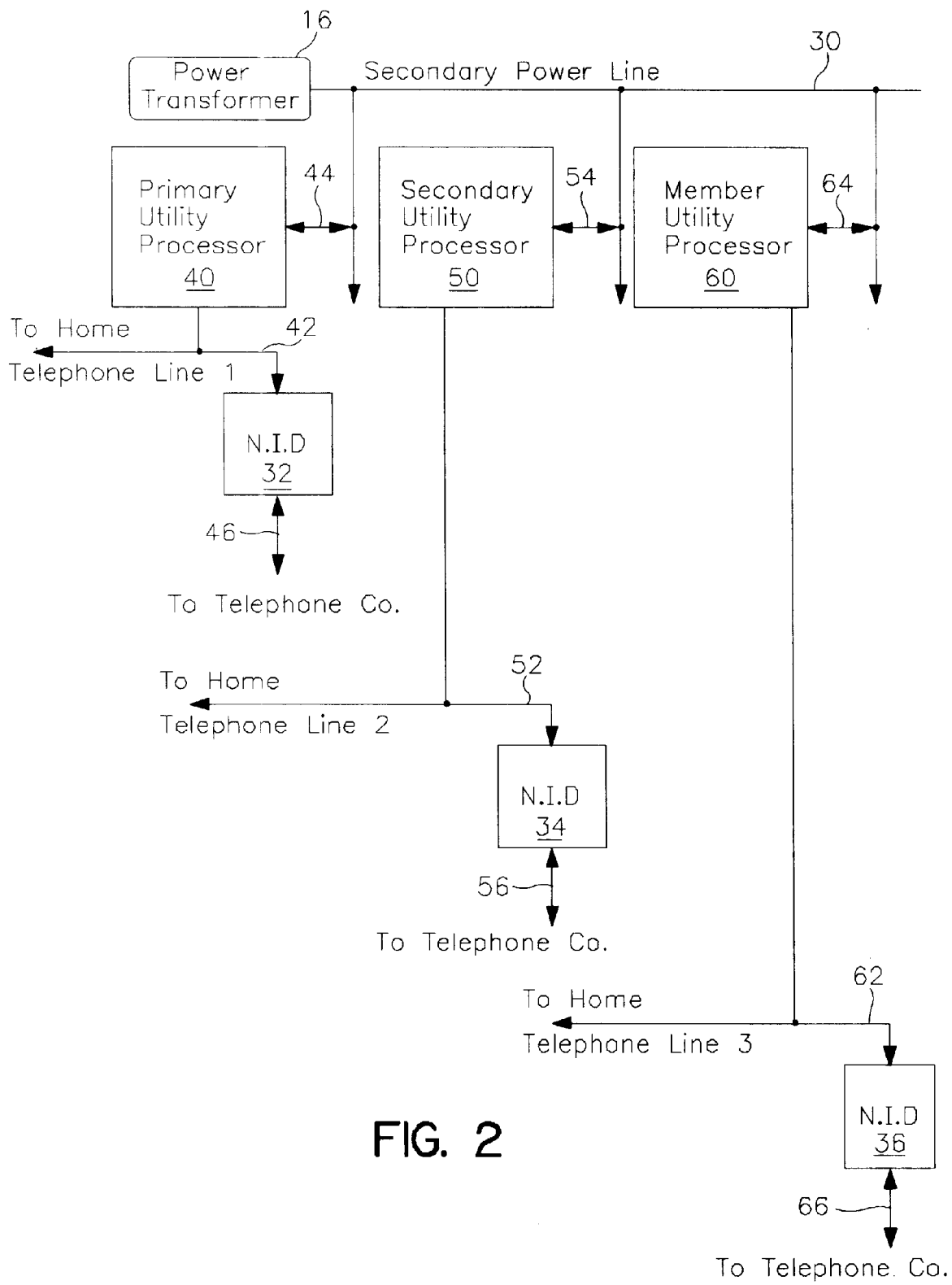
FIG. 2 is a block diagram illustrating a communication scheme of a power line communications network of a presently preferred embodiment.

FIG. 2 illustrates a power line communication network of a presently preferred embodiment. The power line communication network of this embodiment is implemented using Echelon LON-Works™. More information on the use of LON-Works™, may be obtained from published documents such as the LON-Talk Protocol Specification, Doc. No. 19550, and the LON-Works™PLT20 C-Band Powerline Transceiver User's Guide, Doc. No. 078-0117-01.

The system of FIG. 2, implemented on the secondary side of a power transformer 16, includes a secondary power line 30 connected to a primary utility processor 40, a secondary utility processor 50, and at least one member utility processor 60. Each utility processor 40, 50, 60 is further connected to the secondary power line at 44, 54, 64 and each connects to the telephone line 42, 52, 62 on the customer premise side of the NID 32, 34, 36.

The primary utility processor 40 is responsible for communicating alarm conditions to the central office terminal 10 for any utility processor 40, 50, 60 that detects a defect in the telephone line. The secondary utility processor 50 is used as a backup in the event the primary utility processor 40 fails to respond to an alarm condition.

Each utility processor 40, 50, 60 communicates over the power line 30 by transmitting messages called System Network Variable Transmissions (SNVT). SNVTs are messages implemented by the Echelon LON-Works™ system. A SNVT has a format that uses bits in the message to communicate conditions that the system monitors. For example, a bit LINE-CUT may be designated to indicate that a telephone line is defective if the bit is set to a 1 or 0, and that the telephone line is normal if the bit is set to the opposite state (0 or 1).

Each utility processor 40, 50, 60 receives all SNVTs generated by the rest of the utility processors 40, 50, 60. The computer program in the utility processor will control the manner in which each SNVT is processed.

In the Echelon LON-Works™system, a SNVT may be defined to contain codes indicating a condition and an identification, such as a serial number, of the utility processor that generated the message. The conditions defined by the codes include NORMAL, LINE-CUT or any other condition monitored by the utility processor.

When a member telephone line 66 is cut, the member utility processor 60 will detect the cut line condition and report the condition by placing a SNVT on the power line 30 that has a LINE-CUT bit set and the member utility processor 60 serial number. All utility processors will receive the SNVT, but the primary utility processor 40 will process the SNVT by formatting a message and sending it to the central office 10 over the telephone line 42.

If the cut line detected is the telephone line 46 leading to the primary utility processor 40, the primary utility processor 40 transmits a SNVT on the power line 30 in the manner described above. The secondary utility processor 50 notes that a SNVT having a cut-line signal is present and reports the condition since the primary utility processor 40 is unable to do so. The functions of the primary utility processor 40, the secondary utility processor 50 and the member utility processors 60 are explained in more detail in reference to FIGS. 4, 5 and 6.

In the system depicted in FIG. 2, the utility processors 40, 50, 60 may be connected to buildings to monitor other utility conditions. Alternatively, the primary utility processor 40 may have no other function except to function as a primary utility processor 40.

Figure 3:
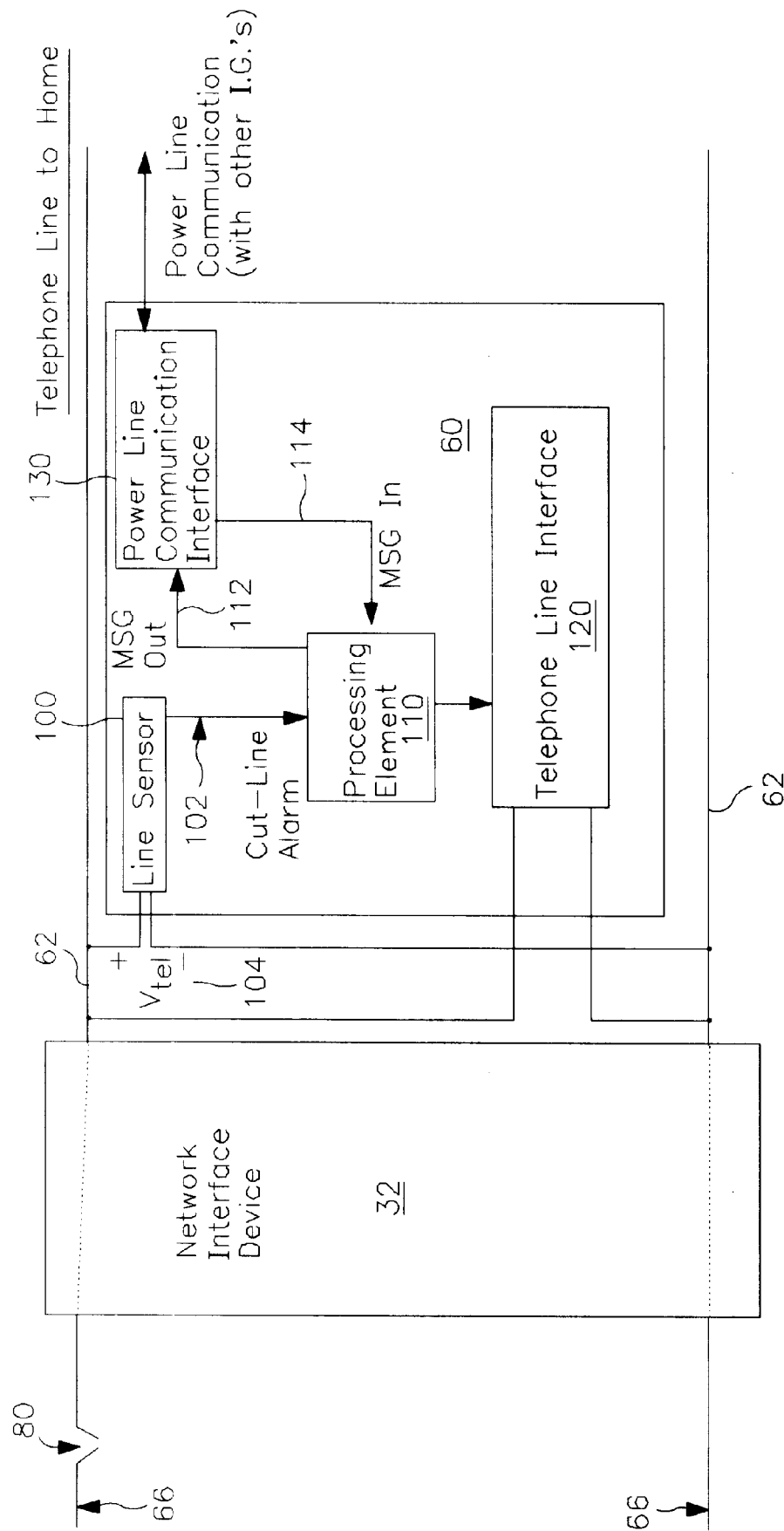
FIG. 3 is a block diagram of one embodiment of a utility processor.

FIG. 3 is a block diagram of the member utility processor 60 of a presently preferred embodiment. The member utility processor 60 includes a line sensor 100 connected to a processing element 110. The processing element communicates with the telephone line interface 120, and with a power line communication interface 130. The primary and secondary utility processors 40, 50 (shown in FIG. 2) may have the same structure as the member utility processor 60 of FIG. 3. One example of the utility processor of a preferred embodiment is represented by the schematics in Appendix A.

The line sensor monitors $V_{tel}$, the voltage across the telephone line 62. The line sensor 100 generates a cut-line alarm 102 when the voltage $V_{tel}$ reaches an alarm threshold. The alarm threshold voltage is dependent upon the system implementation. Different telecommunications systems will present different loads to a utility processor, and some systems may call for a greater sensitivity than others. These factors makes the alarm threshold a substantially system specific design choice. In the presently preferred embodiment $V_{tel}$ is less than one volt for a 48 volt telephone line.

The line sensor 100 may monitor the telephone line by sensing other signal characteristics such as current. The line sensor 100 may also be designed to monitor specific signals such as the presence of a tone impressed on the line.

When the line sensor 100 detects a defective telephone line, the sensor 100 generates a cut line alarm 102 which is sent to the processing element 110. Depending on the implementation, the cut line alarm 102 may be set to require that it indicate an alarm condition for a minimum time period. In a presently preferred embodiment the cut line alarm 102 must indicate a cut line for a minimum of 45 seconds. This time period may be implemented with a hardware circuit that senses the alarm threshold $V_{tel}$, starts a hardware timer and generates a digital interrupt signal to the processing element 110 when the timer expires. In a presently preferred embodiment, the waiting period is a software timer that generates an interrupt to the processing element 110.

The processing element may have two basic functions relating to telephone line defect detection depending on whether it is a member utility processor 60, a primary utility processor 40 or a secondary utility processor 50. The first function is the formatting of internal messages reporting a defect in the telephone line connected to it; the second function, specific to primary and secondary utility processors 40, 50, is the processing of external messages reporting faults in the telephone lines connected to other utility processors in the network.

When the processing element 110 receives a cut line alarm 102, it formats an internal message 112 indicating that a defect was detected in the telecommunications line at 80. The processing element 110 communicates this internal message 112 to the power line communication interface 130 which transmits the message to the utility processors connected to the power line 64 in the form of a SNVT.

Each utility processor is equipped to respond to SNVTs indicating defect detections from other utility processors in the power line 44. A SNVT received from another utility processor is an external message 114. The external message 114 is delivered to the processing element 110 which creates a message that will be reported to the central terminal office 10.

In a presently preferred embodiment, the telephone line interface 120 includes a modem that dials a phone number that may be embedded in the ROM of the processing element 110, or it may be part of a database which includes phone numbers for responding to other conditions. In other embodiments, the telephone line interface 120 may be replaced with a paging communication system, a radio telecommunication interface, a broadband interface or any other communication interface.

In addition, the processing element of a preferred embodiment includes a V25 microprocessor from NEC. The powerline communications interface 130 of a preferred embodiment includes an Echelon Neuron 3150, which communicates with an Echelon PLT20 Transceiver. The Echelon Neuron 3150 is a microprocessor module comprising a Motorola microprocessor, Model Number MC143150.

In different embodiments of the present invention, the utility processors may have a more specialized structure. For example, the primary utility processor 40 shown in FIG. 4 may be used specifically for reporting defects in telephone lines connected to other utility processors. A secondary utility processor 50 having the same structure as the utility processor 40 in FIG. 4 may be included to function primarily as a backup for the primary utility processor 40. Alternatively, a member utility processor 60 as shown in FIG. 3 may be implemented to carry out the function of the secondary utility processor 50.

Figure 4:
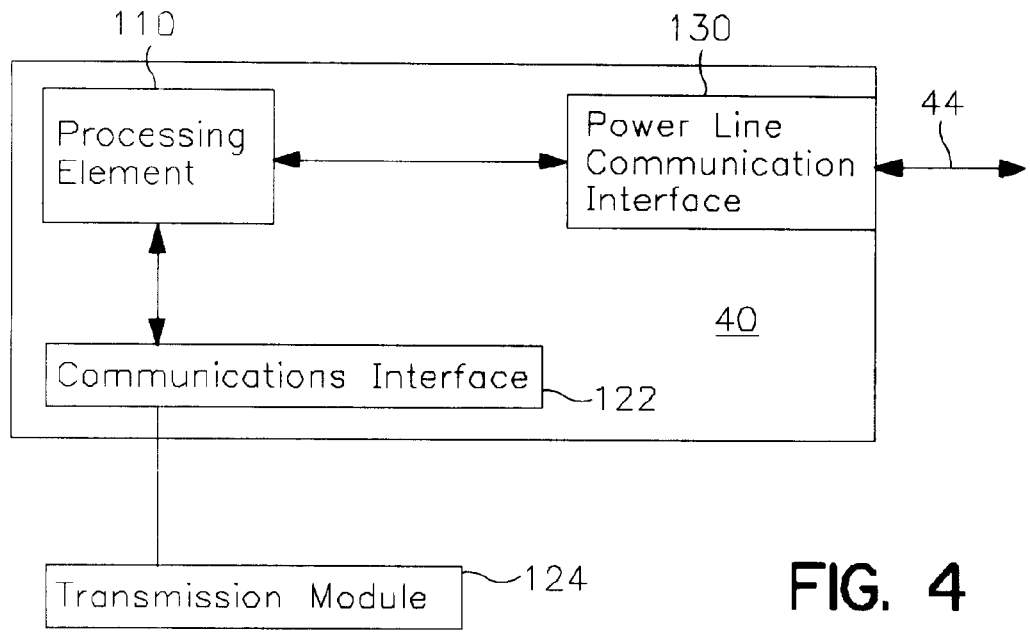
FIG. 4 is a block diagram of an alternative embodiment of a utility processor.

The primary utility processor 40 of FIG. 4 includes a power line interface 130, a processing element 110, a communications interface 122 and a transmission module 124. Alternative communication systems may be implemented. For example, the communications interface 122 may be a paging communication system interface connected to a paging transmitter. Communications interface 122 may be a radio telecommunication interface connected to a radio telecommunications antenna.

Figure 5:
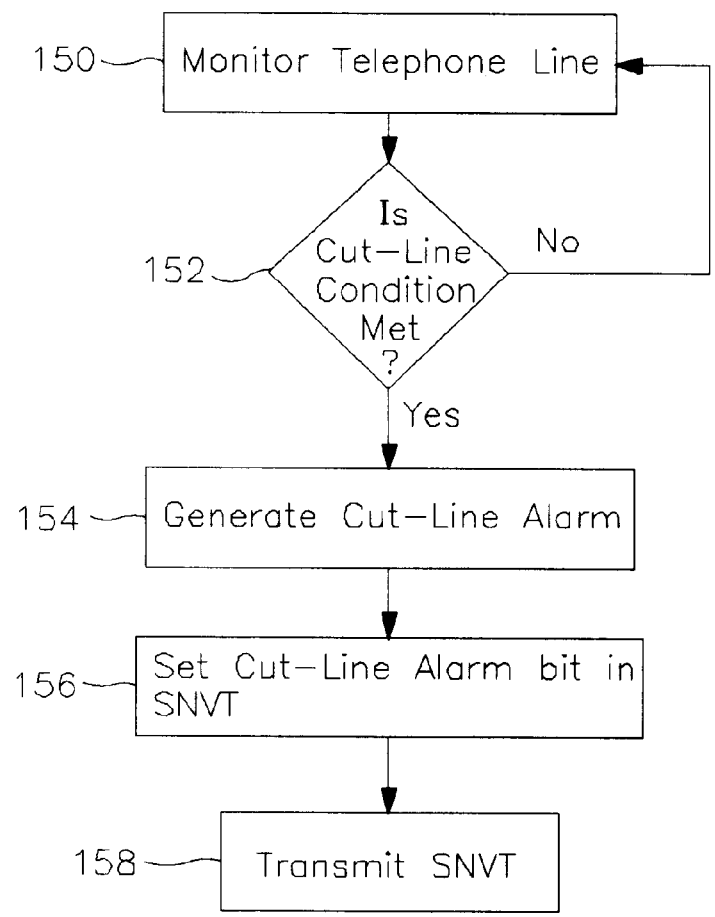
FIG. 5 is a flowchart describing the response of a utility processor of a present embodiment to a defect in the telecommunications line.
Figure 6:
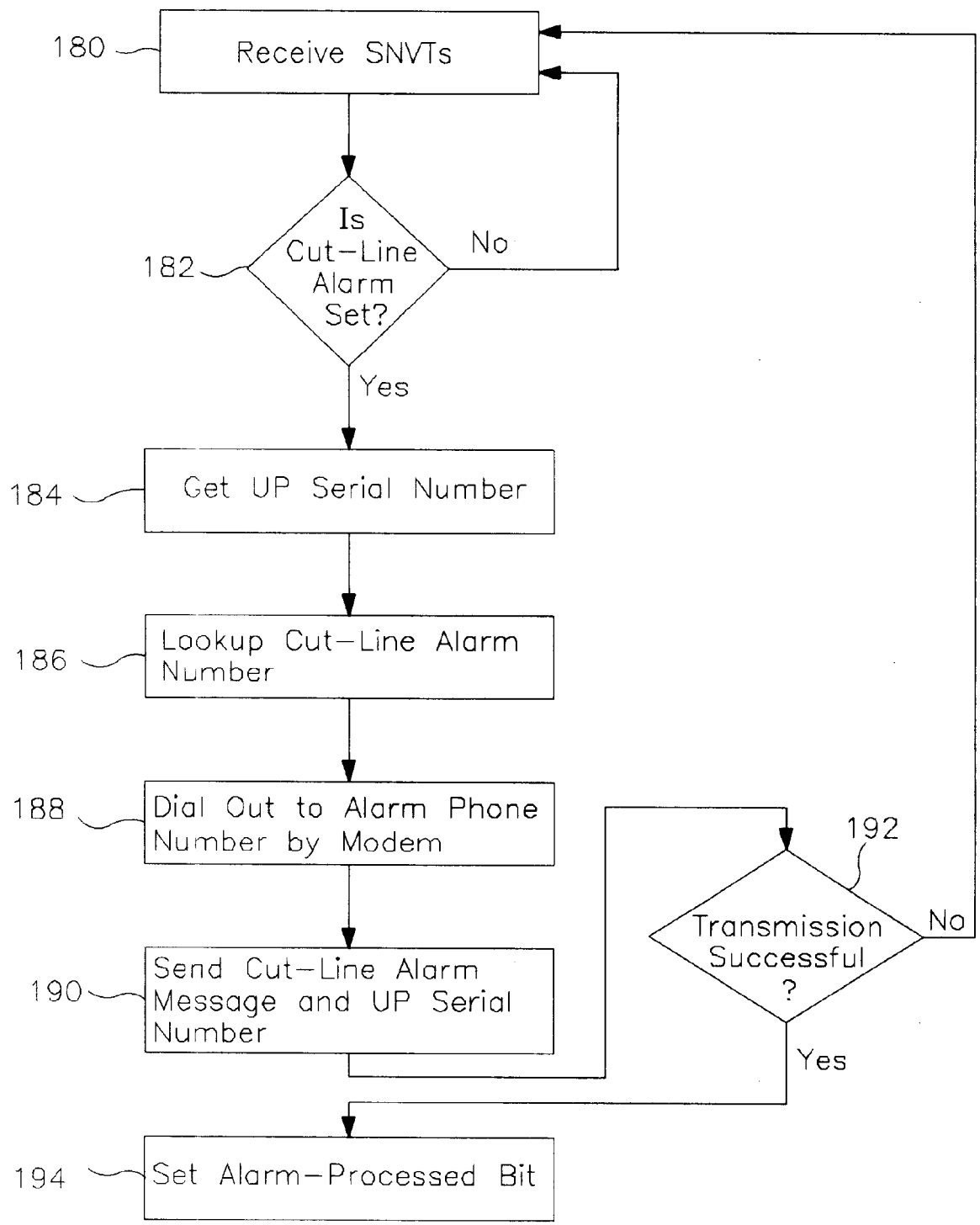
FIG. 6 is a flowchart describing the response of a primary utility processor in a present embodiment of the present invention to the detection of a defect in a telecommunications line by another utility processor.
Figure 7:
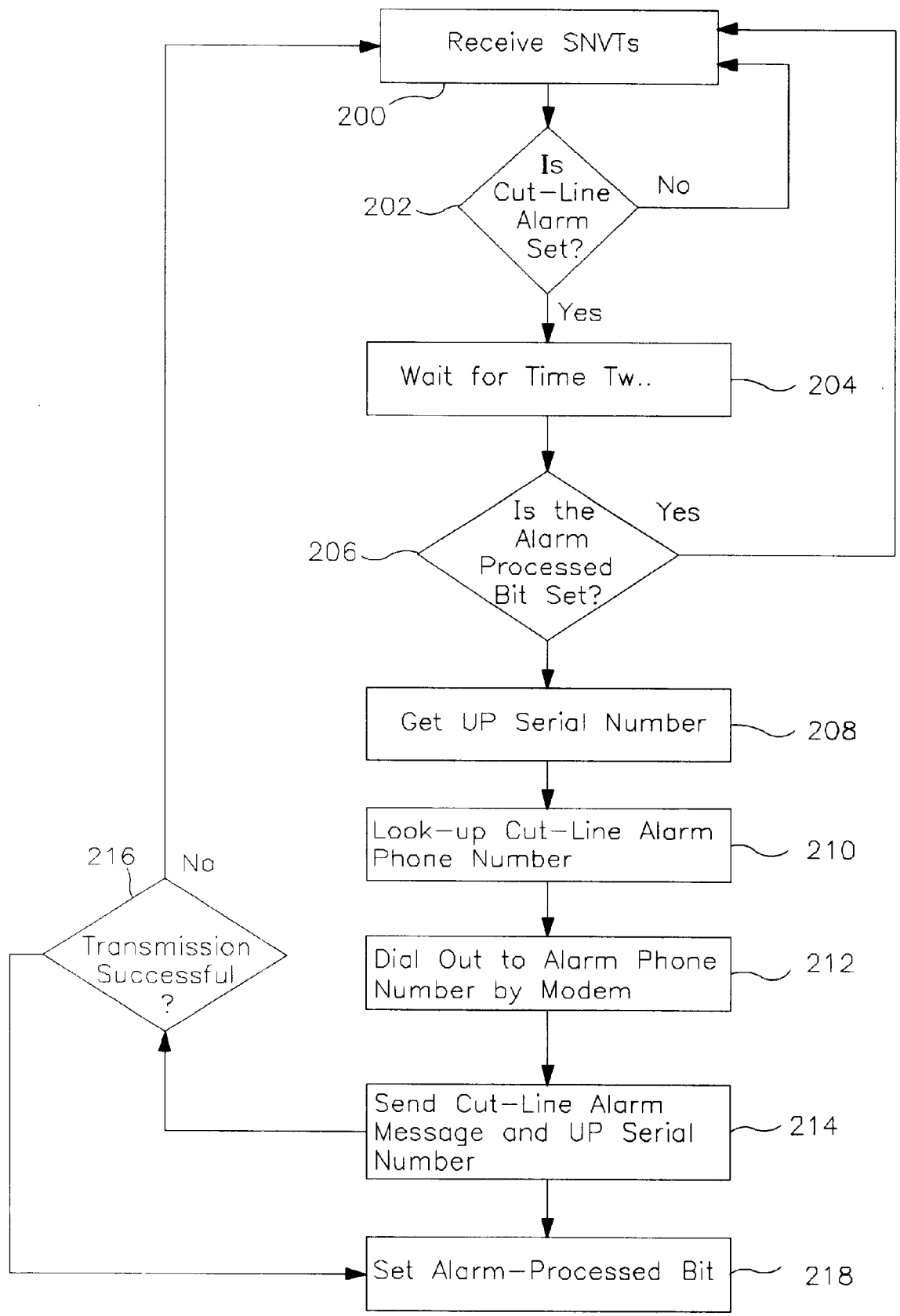
FIG. 7 is a flowchart describing the response of a secondary utility processor in a presently preferred embodiment of the present invention to a defect in the telecommunications line detected by another utility processor.

FIGS. 5, 6 and 7 are flowcharts illustrating presently preferred processes for detecting and reporting a defect in a telecommunications line. As discussed above with respect to FIG. 2, a presently preferred system includes a primary utility processor 40, a secondary utility processor 50, and at least one member utility processor 60. In the description that follows, the three types of utility processors 40, 50, 60 have the structure shown in FIG. 3. The utility processors also implement the Echelon LON-Works™ system of communicating with SNVTs, and any information bits discussed in the description below are bits that make up a SNVT message. The following is a description of the process that each utility processor implements when defect is sensed on a telephone line.

For purposes of the following description, the defect that is to be reported is a cut 80 in the telephone line of a member utility processor 60 (as shown in FIG. 3). In response to the cut 80, the member utility processor 60 implements the process illustrated in the flowchart of FIG. 5. It is to be understood that in the presently preferred embodiment, the steps are performed by a program in the processing element 110 of the member utility processor 60.

The first step in the flowchart of FIG. 5 is the line monitoring step at 150 of the member utility processor 60. This step may implemented by a polling routine in the processing element 110, it may be a part of a timer interrupt scheme in which the line is sensed periodically, or it may be implemented as a purely hardware circuit that generates an interrupt when the cut 80 is sensed.

When a cut 80 is sensed, the utility processor 60 verifies that it remains in a cut condition for a time period sufficient to establish that the line is in fact cut, as shown at 152. If the cut line condition does not remain for the entire time period, the utility processor goes back to monitoring the telephone line at block 150.

If the line voltage does remain below the voltage threshold for a sufficient time period, the utility processor generates a cut line alarm as shown in block 154. The utility processor then sets a cut line alarm bit in its SNVT as shown in block 156. The utility processor then sends the SNVT as shown at 158 via the power line communications network.

The source code in Appendix B is an example of an implementation of blocks 150 to 154 in the flowchart in FIG. 5.

FIG. 6 is a flowchart describing the actions taken by the primary utility processor after detecting a SNVT from another utility processor having a cut line alarm. In an initial state, the primary utility processor receives SNVTs as shown at 180. Each time a SNVT is received, the primary utility processor checks to see if the cut line alarm bit is set in the SNVT as shown at 182. If the cut line alarm bit is not set, the primary utility processor 40 goes back to receiving other SNVTs at 182.

If the cut line alarm bit in the SNVT is set, the primary utility processor 40 extracts an identification number from the SNVT as shown in 184 for the utility processor which generated the SNVT to report the cut line. The primary utility processor 40 looks up a cut line alarm phone number at block 186. The primary utility processor 40 dials out to the alarm phone number via a modem at block 188. Upon obtaining a connection on the modem, the primary utility processor 40 transmits a report of a cut line and an identification number for the utility processor having the cut line at block 190.

The primary utility processor 40 determines next whether the transmission of the report was successful at block 192. If it was successful, the primary utility processor 40 sets an alarm-processed bit in the primary utility processor SNVT as shown at 194. If it was not successful, the primary utility processor 40 returns to receiving SNVTs at block 180.

The flowchart in FIG. 6 may be implemented by a primary utility processor 40 having the structure shown in FIG. 4. In this case, processing is adapted as appropriate for a paging communication system, or any other implemented communication system.

If the primary utility processor 40 has the structure shown in FIG. 3, it is possible that the telephone line 42 connected to it is defective. It is further possible that the primary utility processor 40 may have an internal problem that prevents it from successfully completing a report as shown at 192. If either situation is present, the secondary utility processor 50 takes over the responsibility for reporting line defects as shown in the flowchart in FIG. 7.

The secondary utility processor 50 also receives SNVTs as shown at 200, and is able to check to see if a cut line alarm is set on a received SNVT as shown at 202. If a cut line alarm is set, the secondary utility processor 50 will wait for a time period as shown at 204 sufficient for the primary utility processor 40 to process the alarm. After a time period sufficient for the primary utility processor to process the alarm, the secondary utility processor 50 checks the last alarm processed bit for the primary utility processor 40 as shown at 202. If this bit is not set, the secondary utility processor will process the cut line alarm by extracting an identification number for the utility processor having the cut line from the SNVT as shown at 208. The secondary utility processor 50 looks up a cut line alarm phone number as shown at 210. The secondary utility processor 50 dials out to the alarm phone number via a modem as shown at 212. Upon obtaining a connection on the modem, the secondary utility processor 50 transmits a report of a cut line and an identification number for the utility processor having the cut line as shown at 214.

The secondary utility processor 50 determines next whether the transmission of the report was successful as shown at 216. If it was successful, the secondary utility processor 50 sets an alarm-processed bit in the secondary utility processor SNVT as shown at 218. If it was not successful, the secondary utility processor 50 returns to receiving SNVTs as shown in block 216.

The foregoing description is an example of how the present invention may be carried out. Other embodiments are possible without departing from the scope of the invention. This is especially true with respect to the processing described in reference to the flowcharts in FIGS. 5, 6 and 7. An alternative embodiment may not implement an Echelon LON-Works™ communication system. Either a suitable replacement may be used along with a different scheme for handling defect alarms, or a proprietary communication protocol may be designed.

As one example, each utility processor may have a database containing a set of identification numbers of utility processors that are responsible for reporting faults using the telephone line connected to it. When a utility processor reports a defective telephone line, the utility processor that sensed the defect sends a message to each responsible utility processor in the database. Each utility processor receiving the message will attempt to report the defect in turn until a successful report transmission is achieved.

Other alternatives may be appreciated by one of ordinary skill in the art without departing from the scope of the invention.

- 22 -

INDEX TO APPENDICES

| | |
|---|---|
| Appendix A | Schematic representation of a preferred utility processor |
| Appendix B | Source code that implements the detection of a cut telephone line |

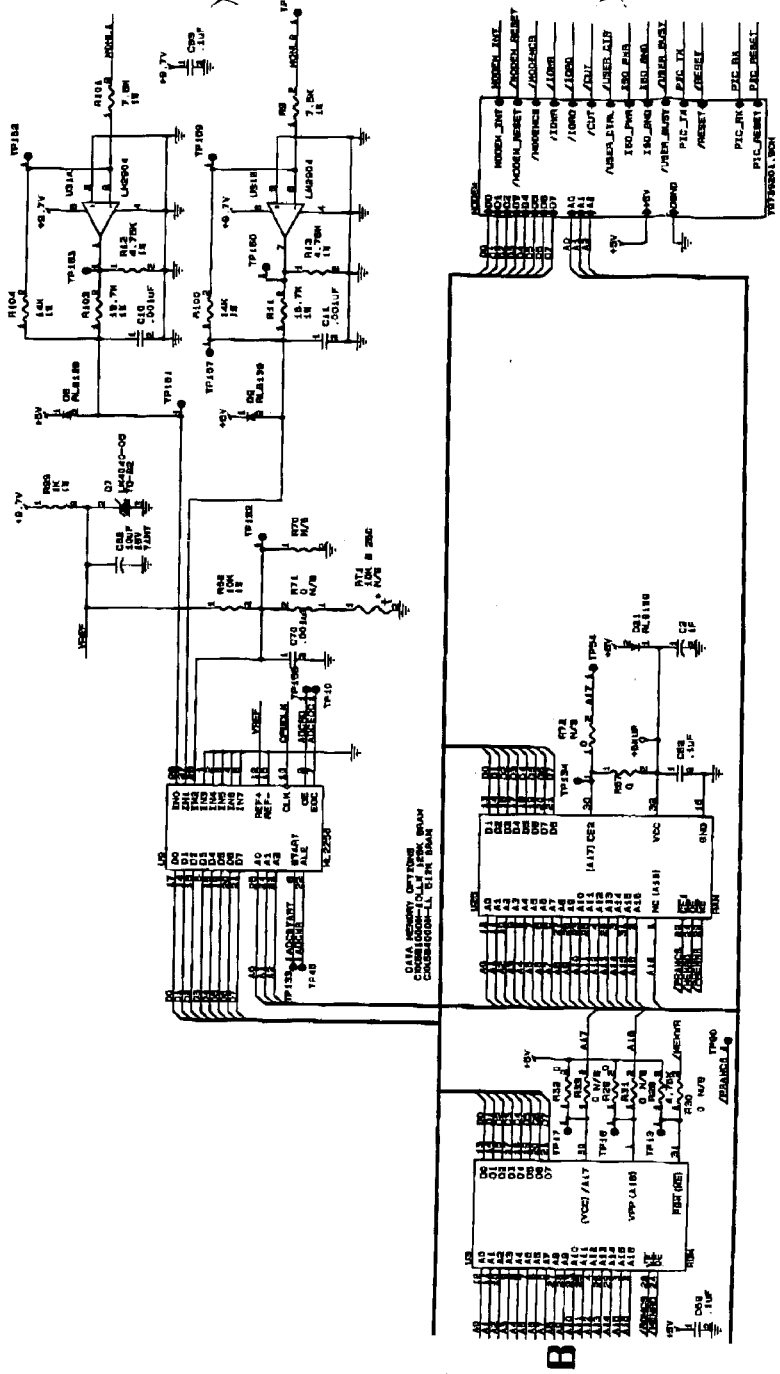

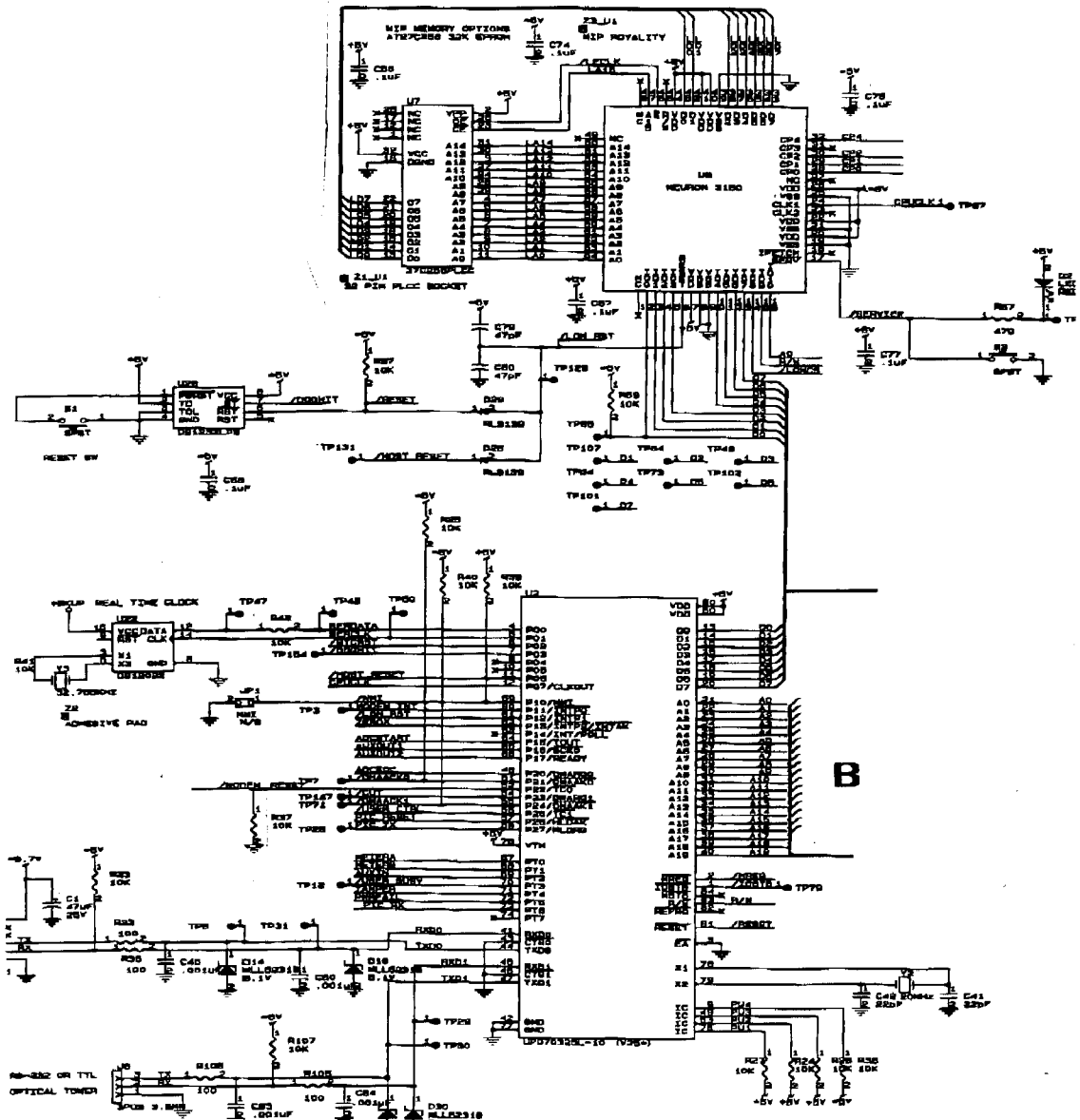
A-2

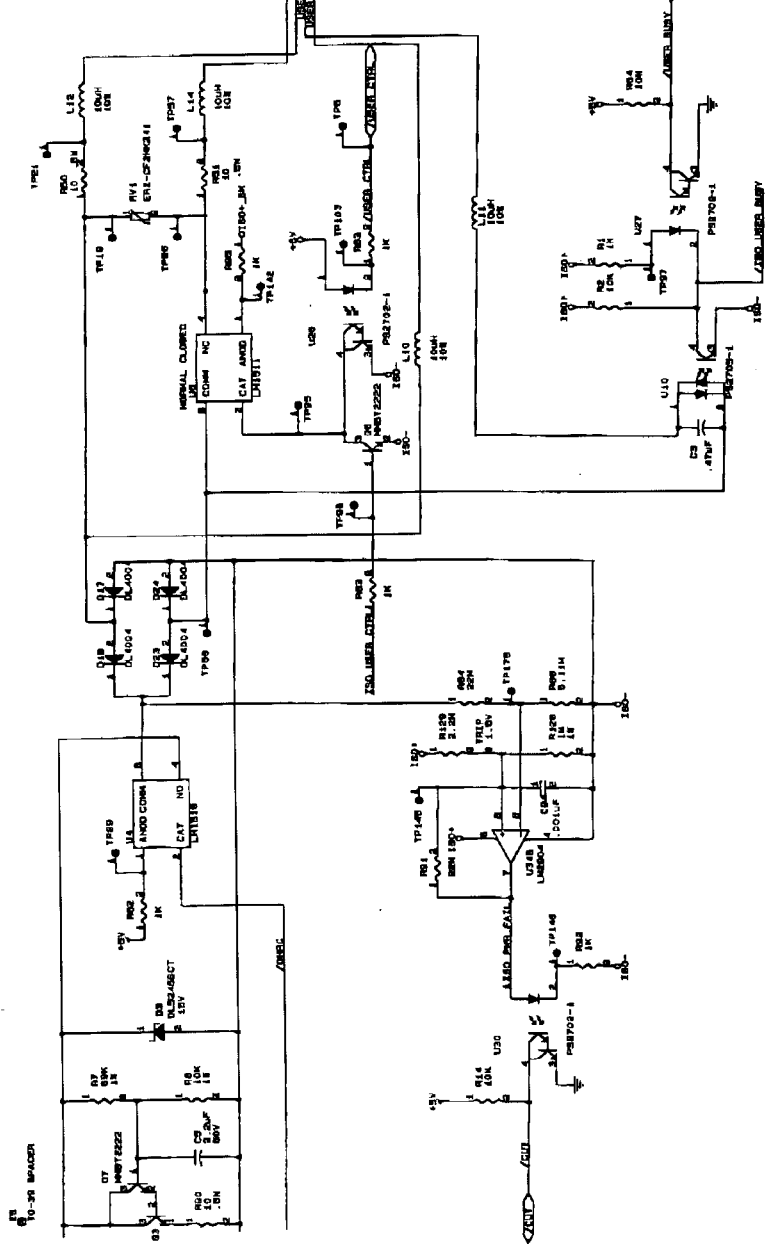

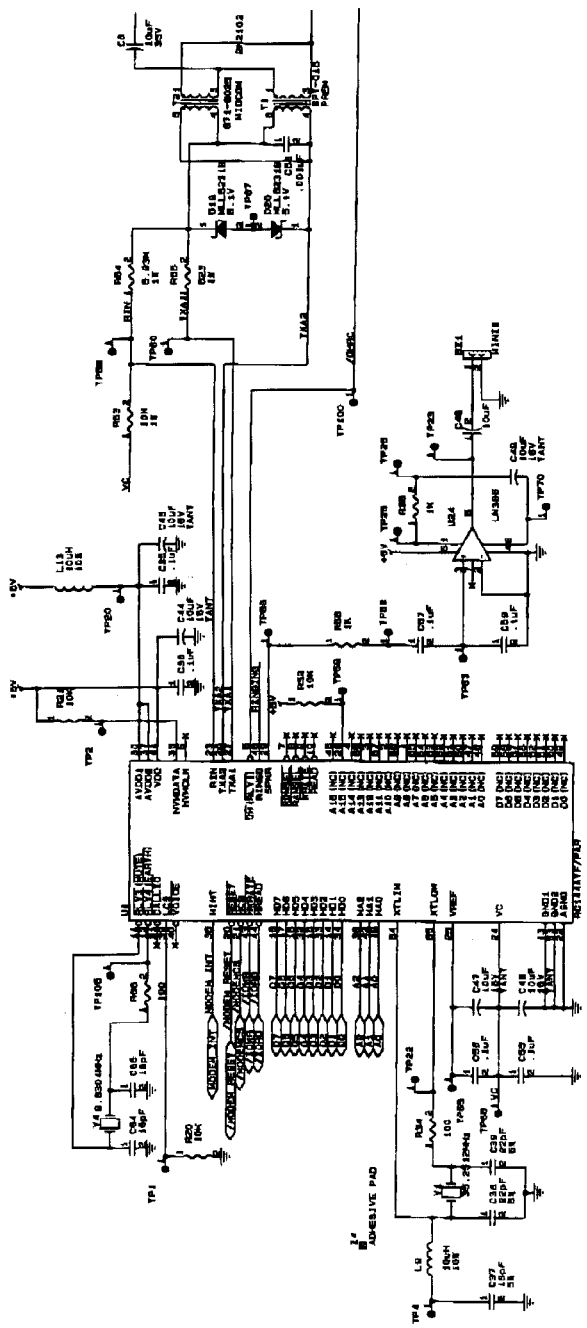

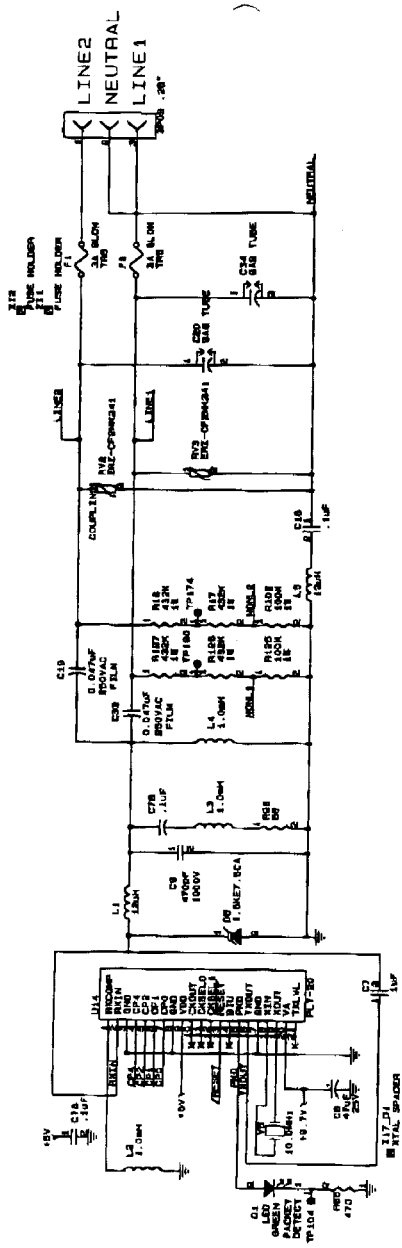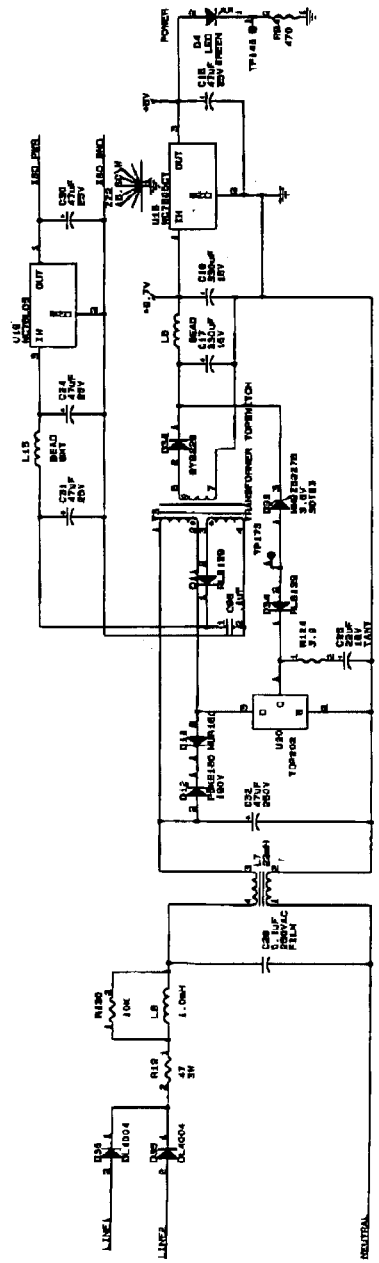

The following software details the following working functionality:

(Checked every 10 ms)

The circuitry will detect a lack of voltage (0) which will indicate a phone line cut. Check for user busy and if the phone is not off hook then check voltage and consider this a cut line. Both states are debounced in order to verify steady state.
When cut line is finally verified, generate alarm event and store in buffer to be uploaded later.

The same check is done for determining a phone line restore state.

```
/************************************************************
 * Filename:      AMERITEC.C
 *
 * Confidential -- Proprietary Information
 * Copyright (C) 1995
 * Ameritech
 *
 *
 * Last Update:   08-08-95 09:11am
 *
 * Description:
 *   Main, interrupt based functions, and various support functions for
 *   the Meter Interface module.
 *
 ************************************************************/ void main(void)
{
        BOOLEAN last_cut_flag;            // Used to tell if line_cut_flag
                                                                          //
changes.
// Store line cut or line restore messages if we need to. BOB
if(last_cut_flag != line_cut_flag)
{
        last_cut_flag = line_cut_flag;
        if(line_cut_flag)
        {
                store_zd_alarm(LINE_CUT);
        }
        else
        {
                store_zd_alarm(LINE_RESTORE);
        }
}
```

B-1

```
//---------------------------------------------
// The ten_ms function is called every 10 milliseconds via a time based
// interrupt.
//---------------------------------------------
void ten_ms(void)
{
    static uchar ad_ctr = 0;        // Counts 10 millisecond time periods    // in between
taking A/D readings.                                                          // inbetween
unloading MIP buffer.
    static uint line_break_ctr = 0;    // timer to keep relay energized
    static uint user_busy_dbnc = 5;    // Debounces user line busy.
    static uint line_volt_ctr = 0;     // Debounces line cut and line restore.

// If user is not idle then perform debounce.
    if(!USER_IDLE)
    {
        if(user_busy_dbnc)
        {
            user_busy_dbnc--;
        }
    }
    else // phone cut
    {
        user_busy_dbnc = 5;

if(line_cut_flag)
        {
            if(!PHONE_LINE_PRESENT) // pin check
            {
                line_volt_ctr = 0;
            }
            else // debounce to see if phone comes back
            {
                if(++line_volt_ctr >= LINE_RESTORE_TIME)
                {
                    line_cut_flag = FALSE;
                    line_volt_ctr = 0;
                }
            }
        }
        else
        {
            if(!PHONE_LINE_PRESENT)
            {
                if(++line_volt_ctr >= LINE_CUT_TIME)
                {
                    line_cut_flag = TRUE;
                    line_volt_ctr = 0;
                }
            }
```

B-2

```
        else
        {
            line_volt_ctr = 0;
        }
      }
    }
  }
```

B-3

```
//---------------------------------------------------------------
// The store_zd_alarm function stores a zero data alarm in MIM event buffer.
// The alarm type is passed as a parameter.
// data in Meter Interface Module event buffer. The event code of the event
// is passed as a parameter.
//---------------------------------------------------------------
void store_zd_alarm(uchar alarm_type)
{
    struct
    {
        uchar   code;
        uchar   data_length;
        uint    time_stamp;
        uchar   alarm_type;
        uchar   option;
    }
    record;

record.code = ALARM_CODE;
    record.data_length = ALARM_ZD_SIZE - 2;
    record.time_stamp = swap_uint(elapsed_seconds[MIM_EBUFF_ID]);
    record.alarm_type = alarm_type;
    record.option = 0;

in_buffer(MIM_EBUFF_ID, &record, ALARM_ZD_SIZE);
}
```

B-4

```
//--------------------------------------------------------------
// The in_buffer function adds a block of bytes pointed to by chr_ptr in
// the buffer whoose buff_id is passed as a parameter. The number of bytes
// adeded to the buffer is passed in the byte_num parameter.
// Returns TRUE if successful.
//--------------------------------------------------------------
BOOLEAN in_buffer(uint buff_id, void *byte_ptr, uchar byte_num)
{
    if (buff_id < DATA_BUFFERS)
    {
        BUFFER_INFO *info;       // Points to buffer information.
        uint new_input;          // New input offset in buffer after bytes have
                                 // been added.
        uint new_output;         // New output offset in buffer after bytes have
                                 // been added.
        uchar i, j;              // Used for loop counting.
        uchar element_end;       // Points to the end of a buffer element that
                                 // we need to throw away because of overflow.

// Set info to point to the desired buffer infromation.
        info = &buffer_info[buff_id];

// Figure out what new output offset is after bytes are added.
        new_input = info->input;
        new_output = info->output;

for(i = 0 ; i < byte_num ; i++)
        {
            if(++new_input >= info->size)
            {
                new_input = 0;
            } if(new_input == new_output)
            {
                if(trans_info.buff_id == buff_id)
                {
                    return FALSE;
                }

// Put first time stamp in buffer_info if time stamp is next
                // element to be over written.
                if(info->buffer[new_output] == TIME_STAMP_CODE)
                {
                    if(++new_output >= info->size)
                    {
                        new_output = 0;
                    }
                    if(++new_output >= info->size)
                    {
                        new_output = 0;
                    }
```

B-5

```
                        for(j = 0 ; j < TIME_STAMP_SIZE-2; j++)
                        {
                                info->t_stamp[j] = info->buffer[new_output++];
                                if(new_output >= info->size)
                                {
                                        new_output = 0;
                                }
                        }
                }
                else
                {
                        if(++new_output >= info->size)
                        {
                          new_output = 0;
                        } element_end = info->buffer[new_output] + 1;

for(j = 0 ; j < element_end ; j++)
                        {
                                if(++new_output >= info->size)
                                {
                                        new_output = 0;
                                }
                        }
                }
        }
}
info->output = new_output;

// Add new bytes to buffer.
new_input = info->input;
for(i = 0 ; i < byte_num ; i++)
{
        info->buffer[new_input++] = *((uchar *)byte_ptr)++;
        if(new_input >= info->size)
        {
                new_input = 0;
        }
}

// Move input pointer.
info->input = new_input;
return TRUE;
}
return FALSE;
}
```

I claim:

1. A method for reporting a defective telephone line in a power line network comprising a plurality of utility processors, each connected to a common power line that functions as a communications medium among the utility processors, at least some of the utility processors each connected to a respective telephone line, said method comprising the steps of:
    (a) monitoring a first one of the telephone lines with a first one of the utility processors to generate a signal in response to a defective in the first telephone line;
    (b) sending a first message with the first utility processor in response to the signal via the common power line to at least two other of the utility processors, each of which is connected to another one of the telephone lines;
    (c) receiving the first message at a second utility processor, one of the two others referenced in part (b);
    (d) attempting to send a second message from the second utility processor to a remote site, said second message indicative of the defective telephone line;
    (e) receiving the first message at a third utility processor, the other of the two referenced in part (b);
    (f) waiting for a time period to receive at the third utility processor a confirmation message indicating that the second utility processor has processed the message; and
    (g) sending the second message from the third utility processor to the remote site when no confirmation message is received at the third utility processor during the time period.

2. The method of claim 1 further comprising, before the step of generating a signal in response to a defect in the first telephone line, the step of verifying that the defect in the first telephone line has been present for a predetermined length of time.

3. The method of claim 1 wherein the step of sending the second message to the remote site comprises the steps of looking up a phone number in a lookup table and sending the second message to the remote site by modem.

4. The method of claim 1 wherein the step of sending the second message to the remote site comprises the step of transmitting paging signals to the remote site.

5. The method of claim 1 wherein the monitoring step comprises the step of measuring a voltage at the first one of the telephone lines and generating the signal when the voltage reaches a low voltage threshold.

6. A system for reporting a defective telephone line to a remote location, said system comprising:
    (a) a first and a second utility processor coupled to a common power line;
    (b) wherein each of the utility processors comprises:
        (i) a power line interface structured to send and receive message to and from utility processors;
        (ii) a telephone line interface connectable to a respective telephone line;
        (iii) a line sensor connectable to the respective telephone line and structured to monitor the respective telephone line and to generate an internal alarm in response to a defect in the respective telephone line; and
        (iv) a processing element structured to process the internal alarm to send an alarm message via the power line interface in response to the internal alarm, and to send a second message to a remote site via the telephone line interface in response to an alarm message;
    (c) wherein a first of the utility processor is structured to send an alarm-processed message on the power line communication interface when the second message is sent to the remote site via the telephone line interface; and
    (d) wherein a second of the utility processor is structured to send the second message to the remote site in response to an alarm message received via the power line communication interface if an alarm-processed message is not received from a different utility processor via the power line communication interface.

7. A system for reporting a defective telephone line to a remote location, said system comprising:
    (a) at least two utility communication links, each comprising:
        (i) a power line interface structured to send and receive first messages;
        (ii) a link processing element structured to process first messages received via the power line interface; and
        (iii) a communication interface structured to send second messages to a remote site in response to one of the first message received by the link processing element indicating the presence of an alarm; and
    (b) at least one utility processor comprising:
        (i) a power line interface structured to send and receive first messages to and from other utility processors and utility communication links;
        (ii) a telephone line interface connectable to a respective telephone line;
        (iii) a line sensor connectable to the respective telephone line and structured to monitor the respective telephone line and to generate an alarm in response to a defect in the respective telephone line; and
        (iv) a processing element structured to process the alarm and to send a first, message via the power line interface in response to the alarm;
    (c) wherein a first of the communication interface is structured to send an alarm-processed message when the second message is sent to the remote site; and
    (d) wherein a second of the communication interfaces is structured to send the second message to the remote site in response to the alarm message received by the power line interface if an alarm-processed message is not received via the power line interface.

8. The system of claim 6 or 7 wherein the line sensor monitors a voltage signal on the respective telephone line.

9. The system of claim 8 wherein the line sensor generated an alarm if the voltage signal falls below a threshold voltage.

10. The system of claim 7 wherein part (a) comprises:
    a first utility communication link designated to be a primary receiver of first messages; and
    at least one additional utility communication link designated to be a secondary receiver of first messages.

11. The system of claim 6 further comprising a communications interface for sending second message to a remote site.

12. The system of claim 7 or 11 wherein said communication interface comprises a modem for communicating by a telephone line.

13. The system of claim 7 or 11 wherein said communications interface comprises a modem for communicating by a radio telecommunication system.

14. The system of claim 7 or 11 wherein said communication interface comprises a modem for communicating by a paging communication system.

15. The method of claim 1 wherein the step of sending the second message comprises the step of transmitting the second message to the remote site over the telephone line connected to the third utility processor.

16. The method of claim 1 wherein the step of sending the second message comprises the step of transmitting the second message by radio telecommunication to the remote site.

* * * * *

UNITED STATES PATENT AND TRADEMARK OFFICE
CERTIFICATE OF CORRECTION

PATENT NO. : 6,072,858
DATED : June 6, 2000
INVENTOR(S) : Robert W. Bellin

It is certified that error appears in the above-identified patent and that said Letters Patent is hereby corrected as shown below:

Column 33, line 5, change "communications" to -- communication --
Column 33, line 10, change "to generate" to -- generating --
Column 33, line 50, change "message" to -- messages --
Column 33, line 58, after "internal alarm" add -- , --
Column 33, line 63, change "processor" to -- processors --
Column 34, line 1, change "processor" to -- processors --
Column 34, line 14, change "communication" to -- communications --
Column 34, line 16, change "message" to -- messages --
Column 34, line 29, after "first" delete the comma
Column 34, line 30, change "communication interface" to --communications interfaces--
Column 34, line 33, change "communication" to -- communications --
Column 34, line 40, change "generated" to -- generates --
Column 34, line 48, change "message" to -- messages --
Column 34, line 56, change "communication" to -- communications --

UNITED STATES PATENT AND TRADEMARK OFFICE
CERTIFICATE OF CORRECTION

PATENT NO. : 6,072,858
DATED : June 6, 2000
INVENTOR(S) : Robert W. Bellin

It is certified that error appears in the above-identified patent and that said Letters Patent is hereby corrected as shown below:

Column 34, line 33, change "communication" to -- communications --
Column 34, line 40, change "generated" to -- generates --
Column 34, line 48, change "message" to -- messages --
Column 34, line 56, change "communication" to -- communications --

Signed and Sealed this

Eighth Day of May, 2001

Attest:

NICHOLAS P. GODICI

Attesting Officer    Acting Director of the United States Patent and Trademark Office